March 15, 1949.  R. H. VARIAN  2,464,276
RADIANT ENERGY DIRECTIVITY PATTERN SCANNER
Filed Aug. 3, 1943  3 Sheets-Sheet 1

INVENTOR
RUSSELL H. VARIAN
BY
ATTORNEY

March 15, 1949.    R. H. VARIAN    2,464,276
RADIANT ENERGY DIRECTIVITY PATTERN SCANNER
Filed Aug. 3, 1943    3 Sheets-Sheet 2
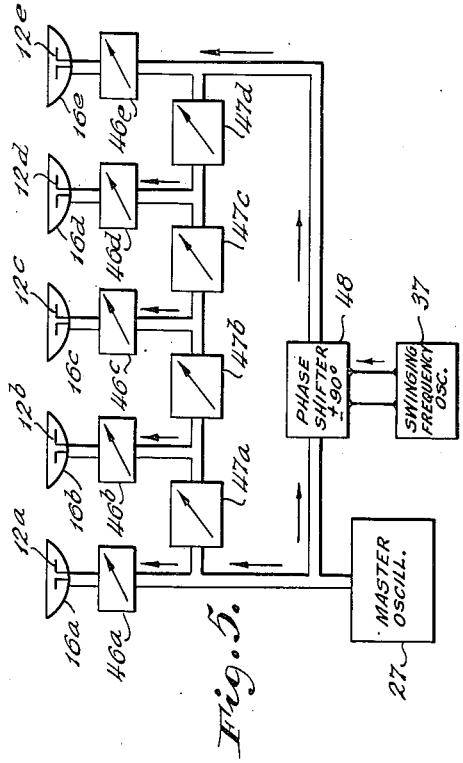
Fig. 5.
Fig. 4.
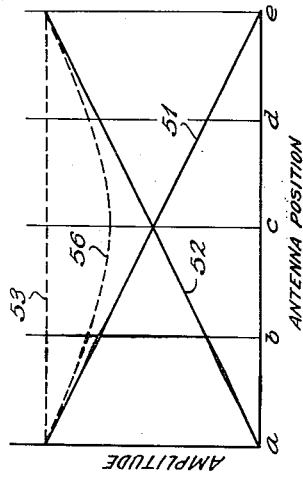
Fig. 6.
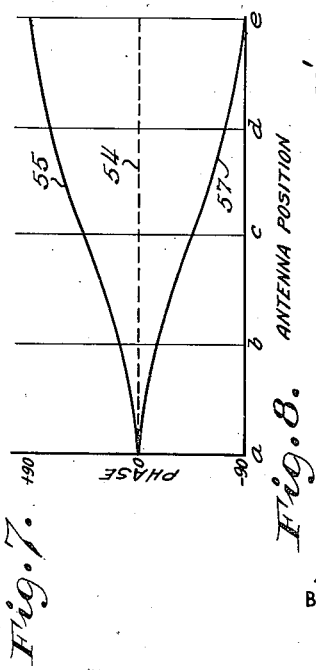
Fig. 7.
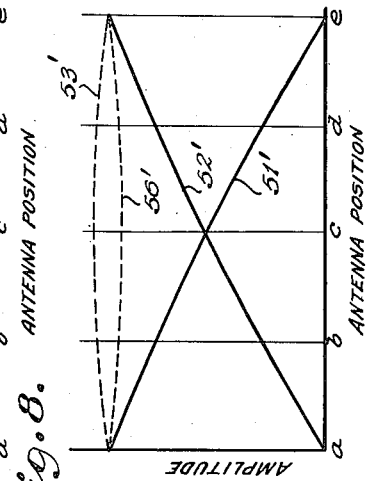
Fig. 8.
INVENTOR
RUSSELL H. VARIAN
BY
ATTORNEY

INVENTOR
RUSSELL H. VARIAN
BY
ATTORNEY

Patented Mar. 15, 1949

2,464,276

UNITED STATES PATENT OFFICE 2,464,276

RADIANT ENERGY DIRECTIVITY PATTERN SCANNER

Russell H. Varian, Garden City, N. Y., assignor to The Sperry Corporation, a corporation of Delaware Application August 3, 1943, Serial No. 497,165

28 Claims. (Cl. 250—33.53)

The present invention relates to the art including directional radio systems and is specifically directed toward such systems utilizing directional beams of ultra high frequency radiant energy or directional receptivity or radiating patterns which are to be periodically varied in direction or "scanned."

In the ultra high frequency field, it is many times desirable to provide a highly directive beam or pattern of radiant energy or a highly directive receptivity pattern, and to vary this beam or pattern periodically. In the prior art it has become customary to provide a narrow directivity pattern and to mechanically rotate or oscillate the pattern-producing device to rotate the pattern as desired. For example, the directional pattern may be obtained by a suitable directional reflector, which may be mechanically and physically rotated to rotate the pattern. However, such systems require the use of added mechanical drives which produce a complexity of apparatus and limit the possible scanning speeds, which is many times undesirable. According to the present invention such a radiant energy directivity pattern scanner is provided which uses no moving parts and produces the required scanning completely electrically.

Accordingly, it is an object of the present invention to provide improved radiant energy beam or pattern scanners which do not require mechanical drive.

Another object of the present invention is to provide improved directional antenna means having a readily variable directional characteristic.

It is another object of the present invention to provide improved circuit means for exciting or abstracting received energy from a linear antenna array.

It is another object of the present invention to provide improved apparatus for exciting or coupling to an electromagnetic wave guide antenna and for producing thereby an oscillating directional characteristic for received or transmitted radiant energy.

It is another object to provide apparatus for producing scanning of a radiant energy directivity pattern which may operate at very high rates of scanning.

It is still a further object of the present invention to provide improved apparatus for periodically varying a radiant energy directivity pattern.

Other objects and advantages of the present invention will become apparent from the following specification and accompanying drawings, in which.

Figure 3:
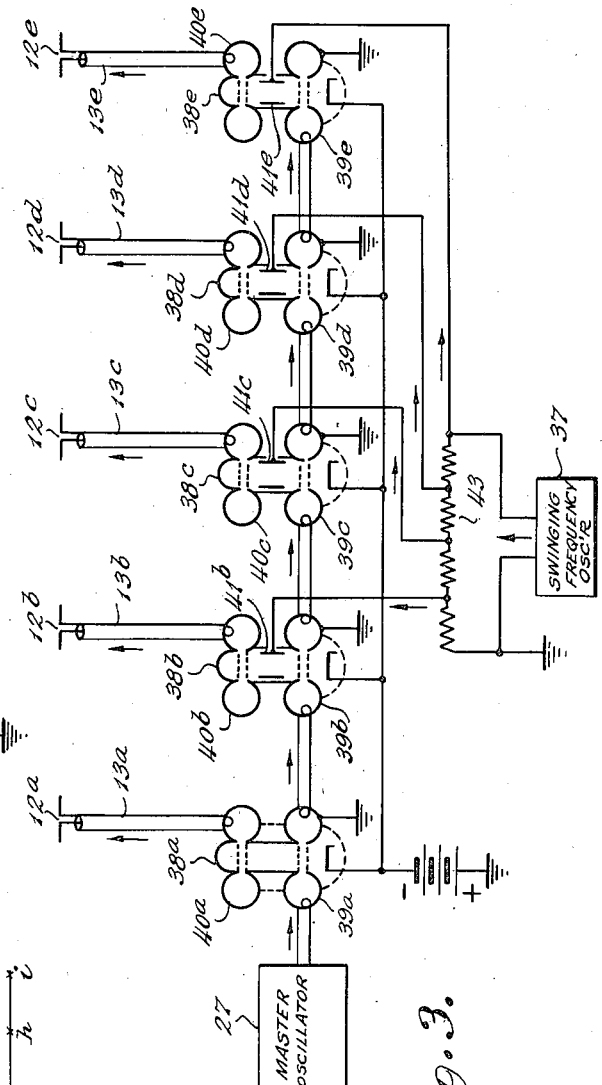

Figs. 3, 4, and 5 show schematic diagrams of modifications of the present invention.

Figs. 6, 7 and 8 show charts useful in explaining the operation of the system of Fig. 5, and Figs. 9, 10 and 11 show still further forms of the present invention using wave guide antennae.

The term "directivity pattern" as used herein is intended to be generic to a radiation pattern and to a receptivity pattern.

Figure 1:
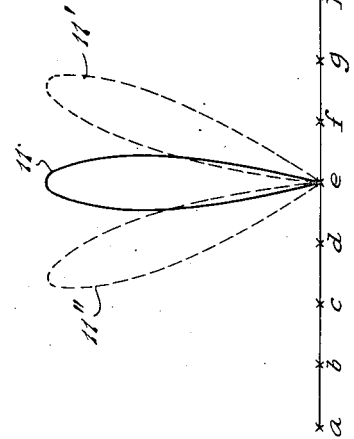
Fig. 1 shows a schematic diagram useful in explaining the operation of the present device.

Referring to Fig. 1, the locations of various non-directional or directional antennae are indicated schematically at $a$, $b$, $c$, etc. If these antennae are arranged in a linear array and are excited with high frequency radiant energy of the same frequency and phase throughout, the radiant energy transmitted thereby will have a directivity pattern such as indicated at $11$, having a directivity axis substantially perpendicular to the array of antenna elements. This pattern is a polar plot of field intensity as a function of angle, for large distances from the array. Such an array may be termed a "broadside array." The particular shape of the directivity pattern $11$ will depend upon the relative amplitudes of excitation of the respective antenna elements $a$, $b$, $c$, etc. By proper choice of these relative amplitudes, the directivity pattern $11$ may have all minor lobes substantially eliminated, leaving merely the single directive lobe $11$. For other amplitude choices, as is well known, minor lobes extending at various angles to the axis of the major lobe will be produced. Fig. 1 may thus be considered to indicate the principal lobe, the minor lobes either being absent or not shown.

If the antenna elements $a$, $b$, $c$, etc., are not excited in like phase but in progressively differing phase, that is, with each pair of adjoining elements having like phase difference, the directivity pattern $11$ will be angularly shifted, for example, to some position such as $11'$ or $11''$, depending upon the sense and magnitude of relative phase shift along the antenna array. In fact, by proper choice of progressive phase shift, the directivity axis $11$ may be made to coincide with the direction of the array, which may then be termed an "end-fire array."

It is to be understood that the antenna elements need not be omni-directional, but may have individual directional characteristics which will correspondingly modify directivity pattern $11$.

Figure 2:
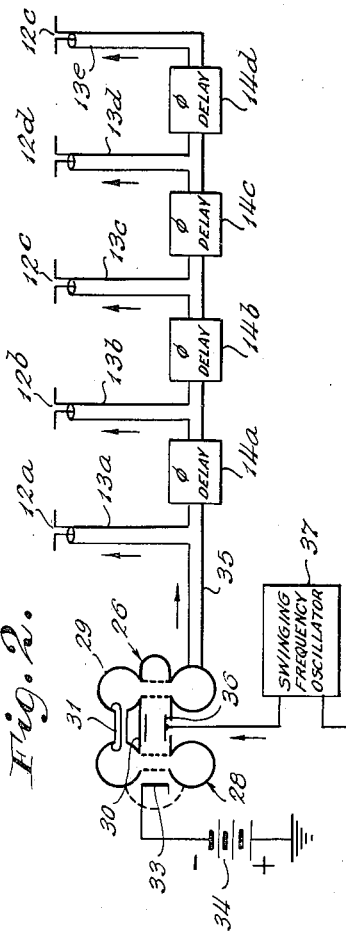
Fig. 2 shows a schematic diagram of one form of scanner according to the present invention.

According to the present invention, the directivity axis of the directional pattern $11$ is caused to progressively and periodically vary or "scan," by providing a periodically varying progressive phase shift for the antenna elements $a$, $b$, $c$, etc. One method of producing this is shown in Fig. 2. In this diagram only five antenna elements, indicated schematically by dipoles $12a$, $12b$, $12d$, and $12e$, are shown. It is to be understood, however, that any suitable or desired number of elements may be utilized, and that, preferably, a large number of such elements is used. The antennae need not be dipoles, but may be any type of antenna, directional or non-directional.

Each of these antenna elements 12 is energized by a suitable high frequency conductor, such as respective concentric transmission lines 13a, 13b, 13c, 13d, and 13e. Connected between each adjoining pair of these feeding transmission lines 13 is a suitable phase shifter, such as 14a, 14b, 14c and 14d. These phase shifters are preferably selected to provide equal phase delays of many cycles at the operating frequency. With constant frequency input, then, the antenna elements 12 will be excited in like phase, and pattern 11 of Fig. 1 will result. If the antenna array is fed by a varying frequency wave applied to element 12a, for example, the change in phase produced at element 12a, by change in excitation frequency will not cause a change in phase at element 12b until after a time delay determined by the delay produced by circuit 14a. Therefore there will be a phase displacement between the waves applied to elements 12a and 12b. Similarly, phase displacements are produced progressively along the array.

These networks 14 may be formed as tuned circuits, or tuned transmission lines, or cavity resonators. Preferably, however, they are formed as time delay networks of any suitable type, which will not vary their output amplitude with change in frequency, as is generally the case with tuned circuits, or resonators.

The antenna elements 12 are fed from a suitable varying frequency oscillator 26, which generates the ultra high frequency energy which it is desired to radiate. This oscillator 26 is preferably of the type disclosed in Hansen and Varian Patent No. 2,281,935, granted May 5, 1942, and comprises a pair of cavity resonators 28 and 29, having their respective confined electromagnetic fields coupled together by a suitable coupling or feedback loop 31, and separated by a field-free drift space defined by drift tube 30. A beam of electrons is projected successively through the resonators 28 and 29 from a cathode 33 and by means of a suitable battery or other source of unidirectional potential 34. In this way sustained oscillations are produced in resonator 29, which may be led, as by means of a suitable high frequency conductor or transmission line 35, to supply the antenna elements 12. The output frequency of the oscillator 26 is determined by the resonant frequencies of the resonators 28 and 29 in the manner discussed in Varian Patent No. 2,242,275, issued May 20, 1941.

Between resonators 28 and 29 and within drift tube 30 is placed a frequency-varying electrode 36, which may be a grid or a cylinder, to which is supplied a comparatively low frequency wave derived from the swinging frequency oscillator 37. This swinging frequency has a value corresponding to the desired periodicity of scanning of the produced directional radiant energy pattern. As is discussed more in detail in Patent No. 2,281,935, the application of this alternating voltage of swinging frequency to the electrode 36 causes the output frequency derived from resonator 29 to shift correspondingly between two limits, that is, to swing in frequency. The average frequency of oscillator 26 is chosen to correspond to the desired frequency to be transmitted, at which a multiple of 360° phase shift is produced between the consecutive pairs of antenna elements 12 by means of phase shifter networks 14.

Then, as the output frequency of oscillator 26 varies periodically under the influence of the swinging frequency oscillator 37, the beam 11 of Fig. 1 is caused to oscillate between two extreme values, such as 11' and 11". The amount of angular shift of the beam 11 is determined by the maximum phase shift produced between the consecutive antenna elements, which is in turn substantially proportional to the amplitude of the swinging frequency voltage applied to electrode 36, and to the phase delay of the phase shift networks 14. In this manner, the beam 11 is oscillated between desired limits at a desired periodicity.

Fig. 3 shows another device for obtaining a progressive phase shift, in which a fixed frequency master oscillator 27 feeds the antenna elements 12, through respective phase shifters 38a, 38b, 38c, 38d and 38e. In the present instance, each of these phase shifters is illustrated as being of the velocity modulation type disclosed in the above-mentioned Patent No. 2,281,935. Each of these phase shifters has a buncher resonator 39a, 39b, etc., and a catcher resonator 40a, 40b, etc. The phase shifters 38 are additionally provided with phase-changing electrodes 41b, 41c, etc., between their buncher and catcher resonators, which, as described in said Patent No. 2,281,935, will produce a phase shift between the wave applied to the buncher resonator 39a, 39b, etc., with respect to that derived from its corresponding output resonator 40a, 40b, etc., the phase shift obtained being determined by the magnitude of the voltage applied to the corresponding phase shifting electrode 41b, 41c, etc. Each of these phase shifting electrodes 41b, 41c, etc., is excited from the swinging frequency oscillator 37 through a suitable voltage divider 43 which is so arranged as to provide equal voltage amplitudes between its respective taps, to which are connected the several phase shifting electrodes 41. In this way, the amount of phase shift produced by each of these phase shifters 38 with respect to the output of master oscillator 27 varies progressively from the antenna 12a to antenna element 12e.

Thus, when the swinging frequency oscillator 37 has an instantaneous zero output, all the phase shifters 38 will produce equal phase shift, and the pattern 11 of Fig. 1 will be produced. As the swinging frequency oscillator output increases, the phase shifters 38 will produce correspondingly increasing progressive phase shifts, so that the directivity of the beam produced by the antenna elements 12 will vary in the same manner as discussed with respect to Fig. 2 and as shown in Fig. 1. In this manner, the circuit of Fig. 3 will produce essentially the same results as that of Fig. 2.

It is to be noted that the principles of Fig. 3 are also applicable to a receiving system. Thus, if a receiver replaces the oscillator 27, and if the inputs and outputs of each of the phase shifters 38 are interchanged, the system will operate as a receiving system with a scanning receptivity pattern. Similarly, in Fig. 2, a receiver may replace oscillator 26. Then a varying frequency received wave will have a directional receptivity characteristic similar to that described for radiation from the device of Fig. 2.

The apparatus of Fig. 3 may also be used to obtain a periodically varying directivity pattern having constant direction. Thus, if the progressive phase shifts of the excitations of the antenna elements are made symmetrical about a central element, and are periodically varied, the pattern will periodically broaden and narrow. As an illustration, the element 12c of Fig. 3 may represent this central element. Then it would have zero swinging frequency voltage applied to it, while equal voltages are applied to elements 12b and 12d, and equal but larger voltages are applied to elements 12a and 12e.

Fig. 4 shows a variation of the circuit of Fig. 3, in which the phase shifters 38b, 38c, etc., are connected between consecutive pairs of antenna elements 12. Then to produce the varying progressive phase shift for the energization of antenna 12, all the phase shifters are swung in phase simultaneously and by the same amount, by means of their connections 20 to the swinging frequency oscillator 37. The result is the same as in Figs. 2 and 3. To produce the periodic pattern widening, the master oscillator would be connected directly to a central element 12 instead of to an end element as in Fig. 4.

Fig. 5 shows a further form of the present invention. In this form of the invention the antenna array 12 is energized from both ends. Each of the antenna elements 12 may have associated with it a suitable reflector 16a, 16b, etc., to reduce minor lobes and to give a radiated power gain in the desired direction. It is to be understood that similar directional means may be added or provided in any of the preceding circuits. Connected to each of these antenna elements is a suitable amplitude adjuster 46a, 46b, etc. and connected between the successive or adjoining elements are further amplitude adjusters 47a, 47b, etc., which are adapted to produce substantially no phase shift or at most to produce constant equal phase shift. It is to be understood that amplitude adjusters 46 or 47 may be formed as attenuating networks and may additionally comprise amplifiers where necessary or desirable.

The master oscillator 27 is connected directly to antenna element 12a through its corresponding adjuster 46a. The amount of energy radiated by antenna 12a therefore may be regulated by its amplitude adjuster 46a. The energy supplied from oscillator 27 is also fed to the remaining antenna elements 12b to 12e through the corresponding amplitude adjusters 47 and 46. By suitable adjustment of these amplitude adjusters, therefore, it will be seen that the amplitude of excitation of each antenna element may be suitably adjusted. In this manner, the beam 11 of Fig. 1 would be produced, with a number and arrangement of minor lobes depending upon the relative amplitudes of excitation of the respective antenna elements 12. According to one mode of operation, the excitations of the respective antenna elements are adjusted in the manner shown by the curve 51 of Fig. 6, that is, to vary in linearly decreasing fashion along the array.

At the same time energy is fed to the other end of the array, that is, directly to antenna element 12e. This is done by feeding the output of master oscillator 27 to a phase shifter or modulator 48 which periodically phase shifts the output of the master oscillator under the control of the swinging frequency oscillator 37. Phase shifter 48 may be of the type shown in Fig. 3. The waves supplied to the respective antenna elements 12 from the phase shifter 48 will then vary in amplitude along the array as shown by curve 52 of Fig. 6, that is, will increase in a linear fashion from antenna 12a to antenna 12e. At the instant that the swinging frequency oscillator 37 has zero output amplitude, phase shifter 48 is adjusted to produce zero phase shift. Accordingly, the wave supplied to each of the antenna elements 12 from the two ends of the array will be in phase, and the amplitude of the total radiation by the array will not vary along the array, as shown by curve 53 of Fig. 6. The relative phases of the waves supplied to the respective elements 12 of the array will then be as shown by the curve 54 of Fig. 7.

The phase shifter 48 and the output of the swinging frequency oscillator 37 are chosen to provide substantially 90° of phase shift for the maximum value of swinging frequency voltage; that is, when the swinging frequency oscillator 37 is providing instantaneous maximum output, the wave supplied from phase shifter 48 will be phase shifted substantially 90° with respect to that of oscillator 27. Considering the phase of the master oscillator 27 as the phase datum, it will be seen that with this maximum phase shift the wave radiated from element 12a will have zero phase, since it is supplied substantially entirely from master oscillator 27, and has zero amplitude supplied from shifter 48 as shown by curve 52. On the other hand, the excitation of element 12e will then have a phase of 90°, since it is supplied with zero amplitude from oscillator 27 and with maximum amplitude from phase shifter 48. The intermediate elements will have intermediate phases at this instant, as shown by curve 55, of Fig. 7 since they will be supplied partially in zero phase from master oscillator 27 and partially in 90° phase from modulator 48 with the amplitudes shown by curves 51 and 52 of Fig. 6. Since the two components of excitation do not now add arithmetically but must be combined vectorially, the resultant amplitude distribution will be as shown in curve 56 of Fig. 6.

When minimum instantaneous voltage (negative maximum) is supplied from swinging frequency oscillator 37, the phase relations will have reversed sign, as shown by curve 57, (Fig. 7) while the amplitude relations will remain as in curve 56.

As the swinging frequency voltage alternates, therefore, it will be seen that the phase relations along the array will vary periodically between the limits defined by curves 55 and 57 of Fig. 7, while the amplitude relations of the antenna elements will periodically vary between the limits shown by the curves 53 and 56 of Fig. 6. The resultant beam will again vary between two limits indicated at 11' and 11'' in Fig. 1.

It may be undesirable to permit such a great amplitude variation as that shown between curves 53 and 56 of Fig. 6, since this will tend to change the beam or pattern shape during its scanning oscillations. To minimize this effect, the amplitude adjusters 46 and 47 may be set to provide a non-linear amplitude variation along the array. By producing a greater-than-average amplitude at the center element of the array, the minimum of the curve 56 may be raised, and it may assume some such shape as shown at 56' in Fig. 8. This may be produced by amplitude variations of the form shown at 51' and 52' in Fig. 8. In such case, the amplitude distribution for zero instantaneous swinging voltage will be as shown at 53', and the over-all variation in amplitude characteristic during swinging of the beam has been greatly reduced. As another mode of operation, the phase shift along the array may be made linear for maximum negative or positive swinging frequency voltage.

The device of Fig. 5 may also be converted to a scanning receiver system by replacing oscillator 27 by a receiving circuit and interchanging the input and output of phase shifter 48.

Figure 9:
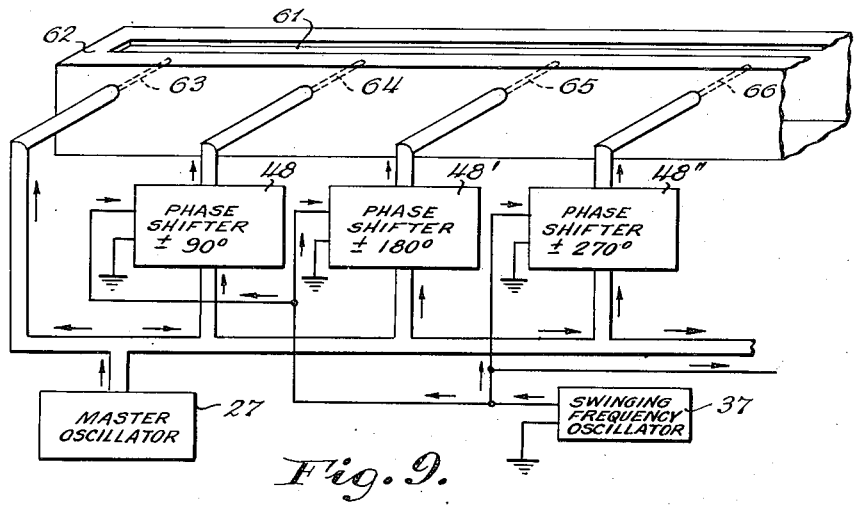

Fig. 9 shows a practical form which the invention of Fig. 5 may assume, especially adapted for use with ultra high frequencies. Thus, the antenna elements 12 instead of being discrete and separated elements, may be formed as a continuous slot 61 in a wave guide antenna 62. If such a wave guide is excited at one end by suitable means, such as a probe 63 energized from the master oscillator 27, the energy distribution thereby radiated will have a drooping characteristic along the wave guide similar to that shown at 51 or 51' of Figs. 5 or 7. Preferably the left end of wave guide 62 is properly terminated to prevent wave reflections.

The actual shape of the energy distribution can be determined by suitably selecting the width of the slot 61. That is, by varying the width of this slot 61 along the length of the wave guide 62 in a desired manner, any desired amplitude characteristic 51 or 51' may be produced. Preferably, the radiating characteristic of the wave guide is so selected that in a reasonable length of wave guide, such as that between probe 63 and a second probe 64, all the energy derived directly from master oscillator 27 will be radiated, so that substantially zero excitation is produced at 64 directly from master oscillator 27. However, probe 64 is excited from the phase shifter 48 which, as shown in Fig. 5, is adapted to vary the phase of its output with respect to that of the master oscillator 27 periodically between limits preferably chosen to be ±90°. Accordingly, the device thus far described in Fig. 9 will operate in a manner identical with that of Fig. 5.

It is not necessary to restrict the apparatus to two feed points as shown in Fig. 5. Any suitable number of feed points may be utilized, in the fashion shown in Fig. 9. Thus, further probes 65, 66, etc., may be located along the length of wave guide 62, each energized by a periodic phase shifter 48', 48'', etc., whose phase swings are related as successive integers and whose phase shifts vary simultaneously and in phase; that is, the phase swing of shifter 48' is twice that of shifter 48, and that of shifter 48'' is three times that of shifter 48, etc. By thus extending the number of phase shifters and the number of feeding points, the amplitude of the swing of beam 11 of Fig. 1 is effectively multiplied, and wide oscillations of the pattern may be produced.

It will be understood, of course, that the apparatus of Fig. 5 may also be extended to provide a larger number of feed points in the manner shown in Fig. 9. This would, of course, require a much larger number of antenna elements 12.

Figure 10:
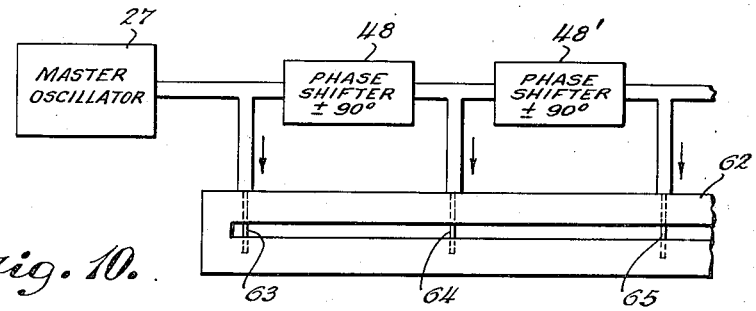

Fig. 10 shows a modification of Fig. 9, in that the phase shifters 48, 48, etc., are connected between the probes 63, 64, 65, etc., so that their phase swings may be made equal. Otherwise this modification operates the same as that of Fig. 9.

Figure 11:
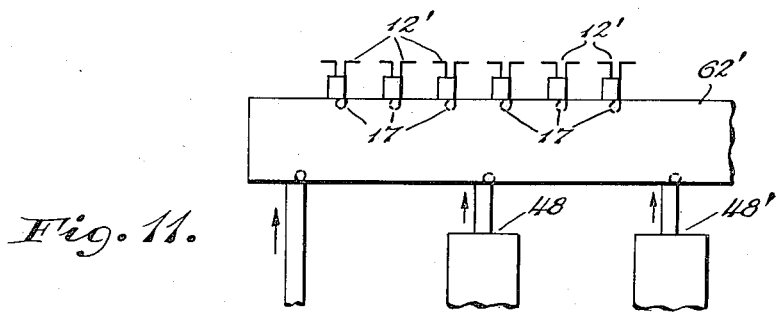

Fig. 11 shows a further modification, applicable to Fig. 9 or Fig. 10. Here, in place of using a slotted wave guide, a plurality of antenna elements 12' may be coupled along the guide 62'. The amplitude variation along the guide may be adjusted by adjusting the couplings of these antennae 12' to the guide 62, as by making their corresponding coupling loops 17 rotatable. If desired, a plurality of discrete openings may be used in place of the antennae 12' of Fig. 11, the sizes of the openings determining the amplitude characteristic along the guide.

Also, the devices of Figs. 9, 10, or 11, may be made into a receiving system in the same manner as in Fig. 5, by replacing oscillator 27 by a receiving circuit, and by reversing the phase shifters.

The devices of Figs. 9, 10, and 11 may also be made to periodically vary the pattern width without scanning in the manner discussed above by providing periodic and progressive phase shifts symmetrical about a central point.

In this way I have provided an improved form of radiant energy directivity pattern scanner which requires no moving parts and can effectively periodically vary the orientation of a highly directive radiant energy receptivity or radiation pattern at a high periodicity.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency directional apparatus comprising a plurality of antenna elements arranged in a linear array, a phase delay network connecting each adjoining pair of said elements and having a phase delay of 360° or an integral multiple thereof at a predetermined frequency, a source of said predetermined frequency comprising a pair of cooperating cavity resonators having a frequency varying electrode disposed therebetween, means for connecting a resonator of said source directly to one of said antenna elements, at one end of said array, and a source of swinging frequency voltage directly connected with said frequency varying electrode for varying the frequency of said first-named source in accordance with said voltage whereby the directivity pattern of said apparatus is periodically varied.

2. High frequency directional apparatus comprising wave guide means for radiating high frequency energy simultaneously from a plurality of points arranged in a linear array, a source of high frequency energy comprising a pair of cooperating cavity resonators having a frequency varying electrode connected therebetween, means for exciting said radiating means from said source, said last-named means including means for producing equal phase delays between the radiation from adjacent pairs of said radiation points, and means comprising a source of swinging frequency voltage connected to said electrode for varying said excitation frequency at a desired rate to correspondingly vary the directivity characteristic of said apparatus at said rate.

3. High frequency directional apparatus, comprising a wave guide a plurality of antenna elements arranged in a linear array along the wave guide, a phase-delay network connected between each adjoining pair of said elements, said networks being adapted to produce equal phase delays, and means for exciting said antennas with a varying frequency comprising cavity resonator means directly connected with at least one of the antenna elements, whereby periodically varying progressive phase shifts along the array are produced.

4. High frequency directional apparatus comprising a plurality of antenna elements, a source of high frequency energy, means for exciting each of said elements from said source, said last-named means including a phase-shifting device connected between said source and each of said elements, said phase-shifting device being adapted to produce a phase shift corresponding to a voltage applied thereto, means for applying progressively increasing voltages to said phase shifting devices, and means for periodically and simultaneously varying said voltages at a desired frequency whereby the directivity pattern of said apparatus is correspondingly varied at said frequency.

5. High frequency directional apparatus comprising a plurality of antenna elements arranged in an array, a phase-shifting device connected to each of said elements, said phase-shifting device being adapted to produce a phase shift corresponding to a voltage applied thereto, a circuit connected to all of said phase-shifting devices, means for applying progressively increasing voltages to said phase-shifting devices, and means for periodically and simultaneously varying said voltages at a desired frequency whereby the directivity pattern of said apparatus is correspondingly varied at said frequency.

6. High frequency directional apparatus comprising a plurality of antenna elements arranged in an array, a phase-shifting device connected between each adjoining pair of said elements and adapted to produce a phase shift corresponding to a voltage applied thereto, means for applying equal periodically varying voltages to said phase-shifting devices, and a circuit connected to all said phase-shifting devices.

7. High frequency directional apparatus comprising a plurality of linearly arranged antenna elements, a source of high frequency energy, means for coupling said source to one of said antenna elements, means for coupling each adjacent pair of said antenna elements, means including said coupling means for individually adjusting the amplitude of excitation of each of said antenna elements from said source, means for deriving a phase-shifted version of the output of said source, means for exciting another of said antenna elements directly from said phase-shifted version, and means for periodically varying said phase shift to vary the directivity pattern of said apparatus.

8. A plurality of linearly arranged antenna elements, means for coupling each adjacent pair of said antenna elements and for adjusting the amplitude of response of said antenna elements, a phase shifter connected at one end of said array, a circuit connected both to said phase shifter and to the other end of said array, and means for periodically varying the phase shift produced by said phase shifter to vary the directivity pattern of said apparatus.

9. High frequency directional apparatus comprising a linearly arranged array of antenna elements, means for coupling adjacent pairs of said antenna elements, a source of high frequency energy, means for exciting said array at one end from said source, and means for exciting said array at the other end thereof by a phase-shifted version of the output of said source.

10. Apparatus as in claim 9, further including means for periodically varying the phase of said phase-shifted output with respect to said source energy.

11. High frequency directional apparatus, comprising a linearly arranged array of antenna elements, respectively independent fixed coupling means for coupling each element to its adjacent elements, a phase shifter independent from the coupling means connected at one end of said array, and a circuit connected both to said phase shifter and to the other end of said array.

12. Apparatus as in claim 11, wherein said circuit is a receiver circuit energized from said phase shifter and said other end.

13. High frequency directional apparatus comprising an elongated wave guide apertured along the length thereof, a source of high frequency energy, means for coupling said source to said wave guide at a predetermined point thereof, and means for also coupling said source to said guide at another point of said wave guide.

14. High frequency directional apparatus comprising an elongated wave guide apertured along the length thereof, a source of high frequency energy, and means for supplying said energy to said wave guide at a plurality of points therealong and with progressively increasing phase shift.

15. Apparatus as in claim 14, further including means for periodically varying said phase shift to provide a periodic variation of the directional characteristic of said apparatus.

16. High frequency directional apparatus, comprising an elongated wave guide apertured along the length thereof, means for utilizing high frequency energy, and means for coupling said utilization means to said wave guide at a plurality of points therealong and with progressively increasing phase shift.

17. High frequency directional apparatus comprising an elongated wave guide apertured along the length thereof, a source of high frequency oscillations, means for supplying said oscillations directly to said wave guide at a predetermined point thereof, means for deriving a phase-shifted version of said oscillations, and means for supplying said phase-shifted oscillations to said wave guide at a second point thereof spaced from said first point.

18. Apparatus as in claim 17, further comprising means for periodically varying the phase shift of said phase shifted energy with respect to that of said source to provide a corresponding periodic variation or scanning of the directivity characteristic of said apparatus.

19. High frequency directional apparatus, comprising an elongated wave guide having means distributed along the length thereof for exchanging energy between the interior and exterior of said guide, coupling means at a plurality of points along said wave guide, respective phase shifters connected to said coupling means and adapted to produce phase shifts progressively varying along said guide, a circuit connected to said phase shifters, and means for periodically and simultaneously varying the phase shifts produced by said phase shifters to vary the directivity characteristic of said apparatus.

20. Apparatus as in claim 19, wherein said circuit is a receiving circuit.

21. High frequency directional apparatus, comprising an elongated wave guide having means for translating energy between the interior and exterior thereof and distributed along the length thereof, coupling means at a predetermined point of said wave guide, further coupling means at another point of said wave guide, and a circuit interconnecting said two coupling means.

22. High frequency directional apparatus, comprising an elongated wave guide having means distributed along the length thereof for exchanging high frequency energy between the interior and exterior thereof, coupling means coupled to said wave guide at a predetermined point thereof, a phase shifter having input and output connections, means for coupling one of said connections to said wave guide at a further point spaced from said first point, and a circuit connected both to said first coupling and to the other of said connections.

23. High frequency directional apparatus comprising a plurality of antenna elements arranged in a linear array, means for exciting said antenna elements with high frequency energy of substantially like phase along said array to produce a substantially broadside directivity pattern, and means for periodically changing the shape of said directivity pattern, comprising means for periodically varying the phases and amplitudes of excitation of said antenna elements symmetrically about an intermediate element of said array.

24. High frequency directional apparatus comprising an elongated wave guide, a plurality of couplings disposed at a plurality of points along said guide, means for supplying high frequency energy to said couplings to excite said wave guide at said plurality of points in substantially like phase to produce a predetermined directivity pattern, and means for periodically changing the shape of said pattern, comprising means for varying the phases of excitation of said couplings symmetrically about an intermediate one of said couplings.

25. High frequency directional apparatus comprising antenna means distributed over a plurality of linearly arranged points, means for exciting said antenna means with progressively varying phases of excitation symmetrically disposed about an intermediate point of said array, and means for periodically and simultaneously varying said progressively varying phases to periodically vary the shape of the directivity characteristic of said apparatus.

26. High frequency directional apparatus comprising means for radiating high frequency energy from a plurality of points greater than two in number, arranged in a linear array, consecutive ones of said points being directly inter-coupled, means independent from the couplings between said points for supplying high frequency energy at one end of said array, and means also independent from said point couplings for supplying a phase-shifted version of said energy to the other end of said array.

27. Apparatus as in claim 26, further including means for varying the phase of said energy version with respect to said first energy to correspondingly vary the directivity characteristic of said apparatus.

28. High frequency directional apparatus, comprising antenna means distributed over a plurality of independently inter-coupled points arranged in a linear array, a phase shifter separate from the intercoupling of said points and connected to said array at one point thereof, and a circuit connected both to said phase shifter and directly to another point of said array.

RUSSELL H. VARIAN.

REFERENCES CITED

The following references are of record in the file of this patent:

UNITED STATES PATENTS

| Number | Name | Date |
| --- | --- | --- |
| 1,667,792 | Martin | May 1, 1928 |
| 1,821,386 | Lindenblad | Sept. 1, 1931 |
| 2,041,600 | Friis | May 19, 1936 |
| 2,173,858 | Pierce et al. | Sept. 26, 1939 |
| 2,226,479 | Pupp | Dec. 24, 1940 |
| 2,245,660 | Feldman et al. | June 17, 1941 |
| 2,297,202 | Dallenbach et al. | Sept. 29, 1942 |
| 2,409,944 | Loughren | Oct. 22, 1946 |

OTHER REFERENCES

Ser. No. 353,755, Dallenbach (A. P. C.), pub. May 25, 1943.